United States Patent
Prasad et al.

(10) Patent No.: US 7,010,600 B1
(45) Date of Patent: Mar. 7, 2006

(54) METHOD AND APPARATUS FOR MANAGING NETWORK RESOURCES FOR EXTERNALLY AUTHENTICATED USERS

(75) Inventors: Ranjan Prasad, Fremont, CA (US); Ramprasad Golla, San Jose, CA (US); Serge Zloto, San Mateo, CA (US); Bo Li, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 945 days.

(21) Appl. No.: 09/895,534

(22) Filed: Jun. 29, 2001

(51) Int. Cl.
*G06F 15/173* (2006.01)

(52) U.S. Cl. .................. 709/225; 709/229; 709/223

(58) Field of Classification Search ............... 709/229, 709/225, 226, 203, 220, 223; 713/200, 201, 713/202
See application file for complete search history.

(56) References Cited

U.S. PATENT DOCUMENTS

| | | | | |
|---|---|---|---|---|
| 6,055,637 A | * | 4/2000 | Hudson et al. | 713/201 |
| 6,088,679 A | * | 7/2000 | Barkley | 705/8 |
| 6,161,139 A | | 12/2000 | Win et al. | 709/225 |
| 6,182,142 B1 | | 1/2001 | Win et al. | 709/229 |
| 6,772,157 B1 | * | 8/2004 | Barnett et al. | 707/9 |

* cited by examiner

*Primary Examiner*—Mehmet B. Geckil

(57) ABSTRACT

A method is disclosed for managing network resources in multiple administrative domains. According to the method, a user is authenticated in a first administrative domain. A token is generated for the user that identifies the user as being assigned a role. The token is configured to identify the user by the role to a component of a second administrative domain. When the user requests a resource of the second administrative domain, its component examines the token and the role to determine whether to grant access to the resource. As a result, the second administrative domain may grant the user access to its resources without re-authenticating the user in the second administrative domain.

26 Claims, 6 Drawing Sheets

METHOD AND APPARATUS FOR MANAGING NETWORK RESOURCES FOR EXTERNALLY AUTHENTICATED USERS

FIELD OF INVENTION

The present invention generally relates to managing resources on a network. The invention relates more specifically to managing network resources for externally authenticated users.

BACKGROUND OF THE INVENTION

Network management systems monitor and manage access to internal resources of a network. The management systems are commonly used throughout local networks and wide-area networks such as the Internet. In general, management systems authenticate a user, and grant privileges or authorizations for access to the network's resources. Examples of network management systems include Resource Management Essentials and CiscoWorks 2000, from Cisco Systems, Inc., San Jose, Calif.

With some network management systems, users are assigned privileges of a class after they are authenticated. The class identification allows that user to receive privileges for accessing that network's resources. The policy that manages the user is tailored for the class. For example, users may identify themselves as "administrator." The network may have a policy to manage access to specific network resources for the "administrator."

The user's class status may be employed throughout that user's administrative domain, where the user was authenticated. Typically, if such users attempt to carry out an operation outside of their currently authenticated administrative domain, the class status is not valid anymore. The user may have to be authenticated in a new administrative domain to receive a new class status. The effect of this, from the user's perspective, is that the user is repeatedly presented with prompts to enter a username and password as the user moves from domain to domain. This interrupts the workflow of the user, and is time-consuming and awkward. Therefore, there is a need for a way to authenticate a user once and have the authentication remain usable and valid as the user moves among administrative domains.

Many current systems are in place to broaden authentication services for network management. One system, Kerberos, developed as part of "Project Athena" at the Massachusetts Institute of Technology, provides an encrypted ticket to clients. The clients can use the tickets to access network resources. The tickets contain identifications of the users. The user's identification is encrypted until the ticket is sent to a service. The service uses an encryption key to identify the user. The ticket also determines information about the user's authentication. In this way, the encrypted ticket serves as an authentication for attempting to access a supporting service. However, Kerberos is complex to implement and requires an extensive supporting infrastructure to work.

Based on the foregoing, there is a clear need in the field for a way of simplifying identification and authorization processes to allow for easier management of network resources to externally authenticated users.

There is a specific need for a way to identify authenticated users by roles or classes to external systems that manage network resources, without using particular identifiers of the users.

SUMMARY OF THE INVENTION

An aspect of the invention provides a method of managing network resources for externally authenticated users. In one specific aspect, the invention provides a method for enabling a user who is authenticated in one administrative domain to be managed as a member of a class in another administrative domain. After the user is authenticated in a first administrative domain, the user is assigned a role that identifies the user as a member of a class. The user can be identified in another administrative domain by the assigned role. The assigned role allows the user to access network resources in the other administrative domain according a policy identified for that role.

In other aspects, the invention encompasses a computer apparatus, a computer readable medium, and a carrier wave configured to carry out the foregoing.

Many other aspects and features will become apparent from the following description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
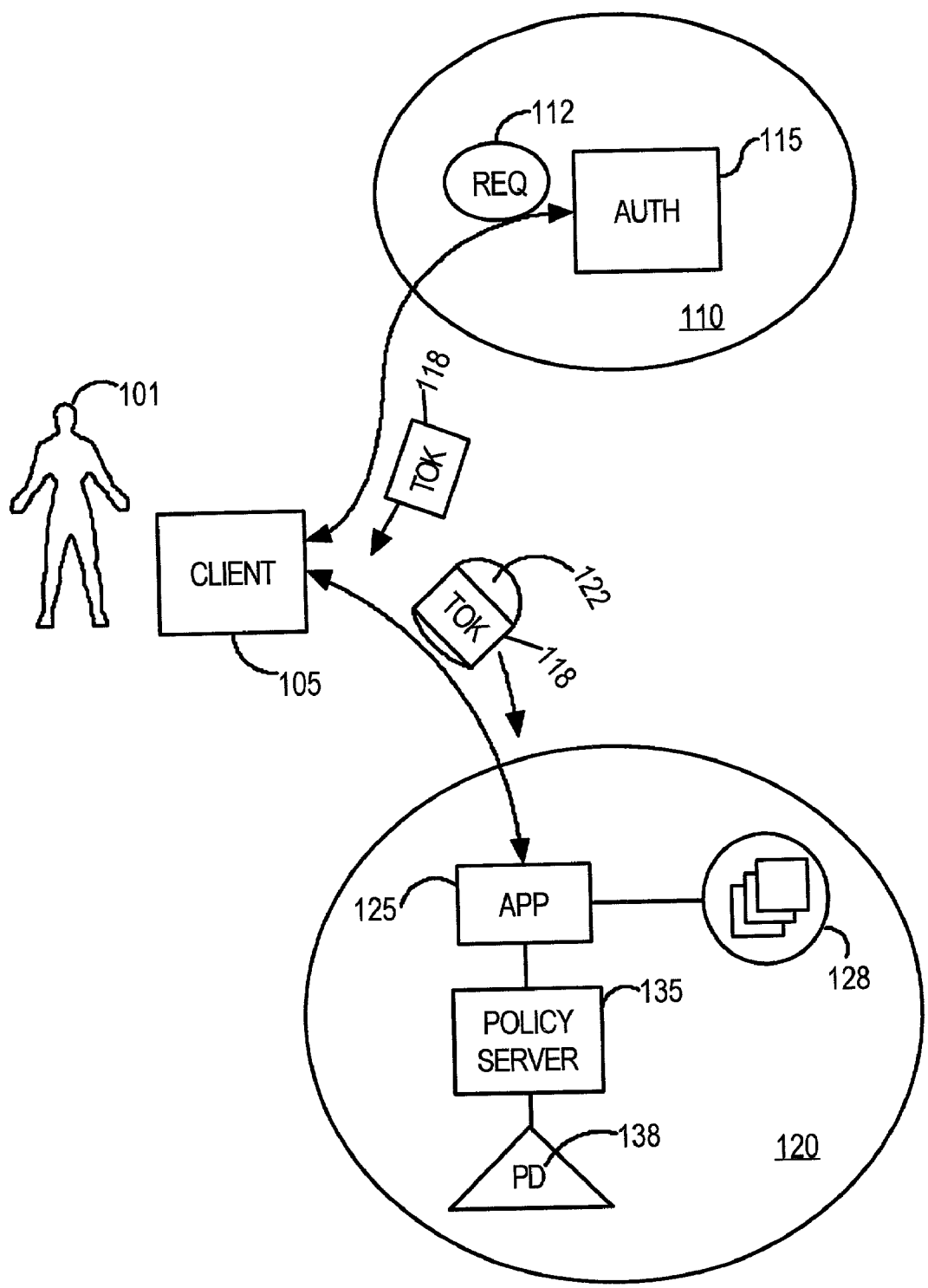
FIG. 1 illustrates a system for managing network resources using a token.

A method and system for managing network resources for externally authenticated users is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A. Overview

Certain embodiments provide for managing network resources in multiple administrative domains. In an embodiment, a user is authenticated by a component of an administrative domain that manages that user. A token is generated for the user after the user is authenticated. The token assigns one or more roles to the user. The token is configured to identify the user by the assigned role to components of another administrative domain.

As a result, may be provided a single authorization service that is conveniently applicable to multiple administrative domains. Different administrative domains may share authentication services to conserve resources. Furthermore, users may be given access to different administrative domains while the identities of the users are kept hidden from administrative domains that are external to the authenticating administrative domain.

When a user is authenticated, a personal identification of the user is determined. In addition, a claimed identity of the user is verified. One conventional manner for authenticating users is to require the user to log-in by providing a user name and a password.

An administrative domain refers to a network domain having a degree of authority to manage or control users with internal components of that domain. Different administrative domains have different degrees of authority to control the same users. Also, different administrative domains may use different components to control users. As an example, a first administrative domain may authenticate a user, and a second administrative domain may control access to internal resources of that domain through a separate authorization process. The second administrative domain may also limit access to the domain by not authenticating the user, but by treating the user as a class member or unknown. Each administrative domain includes one or more network devices, such as switches, routers, gateways, etc., and/or one or more network end stations, such as workstations, printers, storage devices, etc.

In one embodiment, one administrative domain is used to keep an account for a set of users. An account can store log-in information, such as user names and passwords, to authenticate its users. An account may also store other information, such as a log that records access to the administrative domain by each user. Account information may be maintained in an access, authentication and accounting (AAA) server, such as a RADIUS server, in a Kerberos authentication server, or any other suitable system.

As used herein, if an authentication process for authenticating particular users is under the control of one administrative domain, that authentication process is not under the control of another administrative domain. Furthermore, a first domain may use the final result of an authentication process in a second domain, but the first domain cannot control the authentication component that is accessed by the user. As will be described, embodiments allow for users to be authenticated in their own administrative domain, and to use that authentication to access resources in another administrative domain that does not directly manage the user.

A token is a data element that is signaled from a terminal as part of a network communication. The token may include multiple types of information. For example, a token may include an identity of the user, a class assigned to the user, information about the quality of the authentication, and/or a time stamp. The token may reside on a terminal of the user, where it is automatically signaled with network communications from that terminal to targeted domains. Alternatively, the token may reside on an external computer, and may be accessed by components that use it for purpose of network management.

A role is an identification to associate a user as a member of a class. The role provides a criteria or selection parameter that can be used to identify a policy for managing access to network resources. The selection parameter identified by the role is different than a user's personal identification. A class can have one or more users as members. In addition, a class can be identified without requiring any of the members to be identified.

In an embodiment, the token is configured to be accepted by a policy server. The policy server identifies the user as a member of a class identified by the token. Privileges may be extended to the user by a policy of the policy server. The privileges may be uniformly extended to all members of the class that use the same policy server.

Resources that can be managed on an administrative domain include, for example, files, network pages, executable programs, storage space, and communication channels. Resources may be Web-based, such as, for example Web pages, other HTML documents, or Web-based applications.

In another embodiment, a system for managing network resources may be implemented on a computer system comprising processing resources and a storage medium. Processing resources are one or more processors, operating in cooperation. A storage medium is one or more memory components operating in cooperation.

A domain, administrative domain, component of a domain, policy, server, policy server, and other elements described herein may be represented in the form of one or more data representations, abstract data structures, or other information that is created and stored in a computer-readable medium, and managed by one or more software elements. Such data representations may be processed by a network management station, policy manager, or other processor to accomplish the methods described herein.

B. System Description

FIG. 1 illustrates a system for managing network resources using a token.

A user 101 is associated with a client 105 that is communicatively coupled to a network. Client 105 is a workstation, personal computer, or other network end station device; alternatively, client 105 is a network infrastructure device such as a router, switch, gateway, etc.

The network includes a first administrative domain 110 and a second administrative domain 120. First administrative domain 110 includes an authorization ("AUTH") component 115. Second administrative domain 120 includes an application 125 having one or more network resources 128. The application 125 interacts with a policy server 135, which has access to a policy database 138. Each of the foregoing elements is communicatively coupled directly or indirectly through one or more networks or internetworks. In one embodiment, first administrative domain 110 and second administrative domain 120 are logical domains of a campus network; in other embodiments, the domains are widely geographically distributed.

For purposes of illustrating a simple example, FIG. 1 shows one user and client, two administrative domains, and one authentication component. However, in an implementation, there may be any number of such elements.

The user 101 operates client 105 to access the first administrative domain 110. The first administrative domain 110 is where management and administration components reside for user 101. The user 101 may signal an authentication request 112 to first administrative domain 110 to receive an authorization. An authentication component 115 may be located in first administrative domain 110 to authenticate or verify the identity of user 101 from authentication request 112. The authentication component 115 manages an account for user 101. In one implementation, user 101 signals login information, such as a user name and password, to the authentication component 115. An authentication process conducted by authentication component 115 verifies the submitted login information with stored login information in the user's account.

Once authenticated, user 101 may be provided privileges and constraints for accessing network resources from other components of first administrative domain 110. Such privileges and constraints define how the user is authorized to access such network resources. The user may, for example, access a management component on first administrative domain 110 that manages access to certain resources, such as files, information, or executable programs. These other components may receive communications from a policy server (not shown) or other component of the first administrative domain to identify a policy governing the privileges and constraints of the user 101.

In other systems, the user's authentication was valid only for first administrative domain 110, because the user's account was maintained in that domain. In contrast to the other systems, embodiments of the invention provide for the authentication received in first administrative domain 110 to be transferable to other administrative domains.

In an embodiment, the authentication in first administrative domain 110 is transferable to second administrative domain 120 by way of a token 118. The token 118 may be generated on authentication component 115, or another component of first administrative domain 110. In an example provided, the token 118 is signaled to second administrative domain 120 with a request 122 to access network resources in that domain. As will be further described, an embodiment provides that token 118 identifies user 101 as a role to a component of second administrative domain 120.

The second administrative domain 120 includes an application 125 that manages network resources 128. The application 125 securely manages the resources 128 to prevent unauthorized access. The application 125 communicates with a policy server 135 to access a policy from a policy repository 138. The application 125 uses the policy to grant the user 101 access to resources 128. Different policies may be used to manage users that request access to resources 128.

In an embodiment, token 118 is provided from client terminal 105 to application 125. The token 118 is provided while a network session initiated when user 101 was authenticated on first administrative domain 110 is still ongoing. The application 125 signals token 118 to policy server 135. The policy server 135 uses token 118 to identify the role assigned to the user by authentication component 115 of first administrative domain 110. The policy server 135 selects a policy from policy repository 138 using the role identified from the token. The application 125 manages access to resources 128 using the policy selected from policy server 135.

In one implementation, the token may be used in both of the first and second administrative domains 110, 120. As such, policy servers in either domain can identify a policy for the user. The policies may be different for different domains.

Another feature provided under an embodiment is that authentication of the user takes place in first administrative domain 110, but the policy that dictates the user's access to resources on second administrative domain 120 can be generated from the policy server 135 of the second administrative domain 120.

In this way, the second administrative domain 120 does not have to relinquish control of its policies to the first administrative domain 110 to enable users of the first administrative domain to access its resources. The first administrative domain 110 also does not have to divulge the identification of one of its users. Furthermore, second administrative domain 120 may provide resources to a user that is not being managed in that domain, but rather in first administrative domain 110.

In one implementation, first administrative domain 110 and second administrative domain 120 each correspond to an Internet Service Provider (ISP). The user 101 may be a member of the ISP corresponding to first administrative domain 110. The authentication component 115 may, for example, be conducted during a dial-up process to couple client terminal 105 with the ISP.

During the authentication process, user 101 may be provided with token 118 for use with the second ISP, corresponding to second administrative domain 120. It is also possible for the token to be configured for use with the first ISP, corresponding to first administrative domain 110. The client terminal 105 may access the second ISP using a connection established with the first ISP. The token 118 may be submitted by the user automatically with a request to application 125 to access a Web-based resource. For example, application 125 may manage access to resources 128 that include a game, message center with chatting, streaming audio, etc., and/or a members-only search engine and database. The user 101 may request access to one of the games or the message center.

The token 118 identifies user 101 by a role. For example, the token may identify user 101 as a subscriber to the first ISP. The application 125 signals token 118 to policy server 135 for the second ISP. The policy server 135 uses the role to identify a policy for user 101.

In one implementation, the role provided to the user in the first domain 110 may be mapped by the policy server 135 (or another component of the second domain) to another role for the second domain 120. Thus, the user may have one role in the first ISP, and that role is mapped by the second ISP to give that user another role in the second ISP. The mapped role provided to the user in the second ISP is used for determining the policy of that user in the second ISP. Likewise, the role provided to the user in the first ISP is used to determine the policy for the user in the first ISP.

In the example, the policy selected may correspond to a policy for all members of the first ISP. To further the example, the policy retrieved by policy server 135 may dictate that, as a subscriber of the first ISP, user 101 is to be provided access to resources that coincide with games, the message center, a depository of messages, but not the members-only search engine and database. The application 125 serves requests from user 101 and provides the resources 128 as dictated by the policy. If the user 101 requests access to the members only search engine, the request is denied.

Using a system such as described with respect to FIG. 1, token 118 can be configured to hide the identity of user 101. Therefore, the first ISP and second ISP may agree to share resources for users, but neither ISP has to reveal the identity of their subscribers. Thus, the ISPs may protect their customer bases, while sharing their resources with their mutual customers.

In one implementation, business logic may exist between the first administrative domain 110 and second administrative domain 120 to allow the administrative domains to share resources with users. For example, the first ISP and second ISP may share a billing policy. The second ISP may charge the first ISP for users of the first ISP that access resources on the second ISP. The first ISP may then bill its users for accessing the second ISP. This avoids the second ISP from having to bill the user of the first ISP directly.

Figure 2:
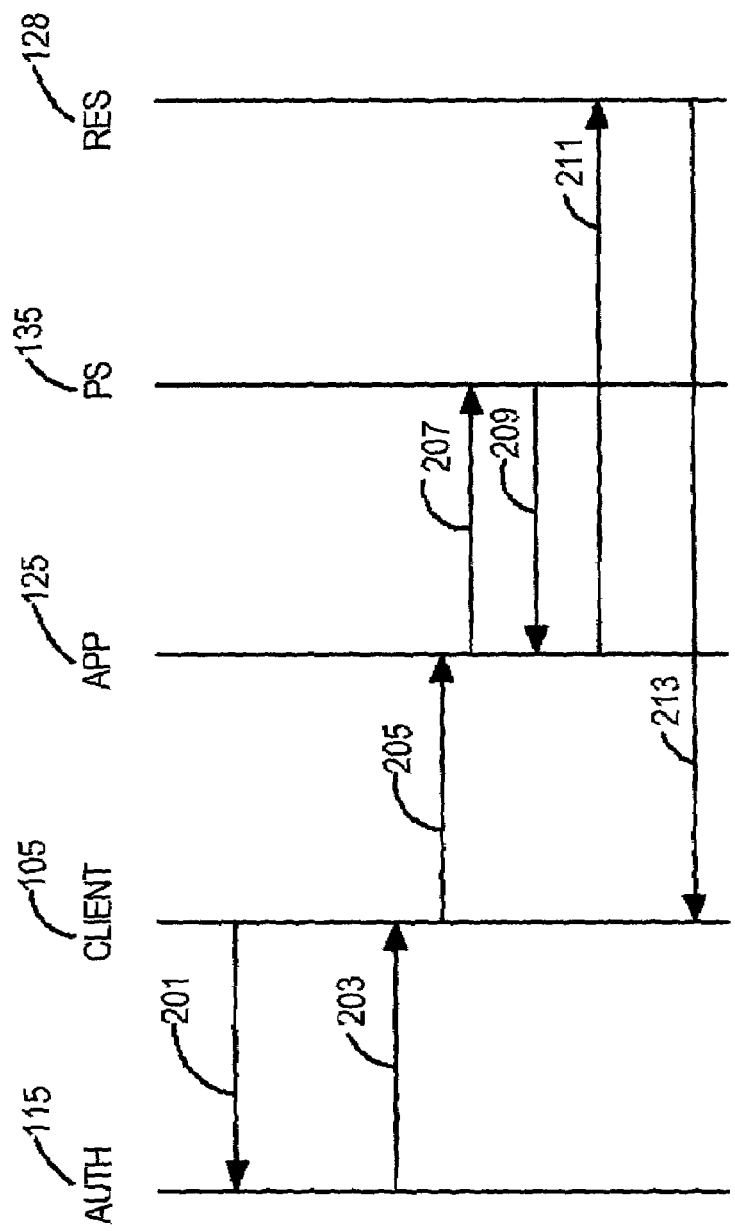
FIG. 2 is a sequence diagram for a system, such as the system of FIG. 1.

FIG. 2 is a sequence diagram for a system, such as described herein with FIG. 1.

According to an embodiment, client 105 signals a request 201 to be authenticated by authentication component 115 in first administrative domain 110. The authentication component 115 returns a signal 203 confirming or denying the authentication request. The signal 203 may carry token 118 as shown in FIG. 1.

If the signal 203 confirms the authentication request, client 105 is free to access application 125.

The client 105 then may signal a request 205 for resources from application 125, which manages resources 128 in second administrative domain 120. The request 205 may carry token 118. The application 125 submits the token 118 to policy server 135 in a policy request 207. The policy server 135 uses the role identified in token 118 to select a policy for the user. The policy server 135 returns the selected policy 209 to application 125. The application 125 uses the policy 209 to signal a request 211 for resources 128. The resources are returned to client 105 in a response 213. Alternatively, the resources may be made available to a user of client 105 on another computer.

As a result, the client can access resources in multiple administrative domains after undergoing only one authentication process.

C. Method Descriptions

Figure 3:
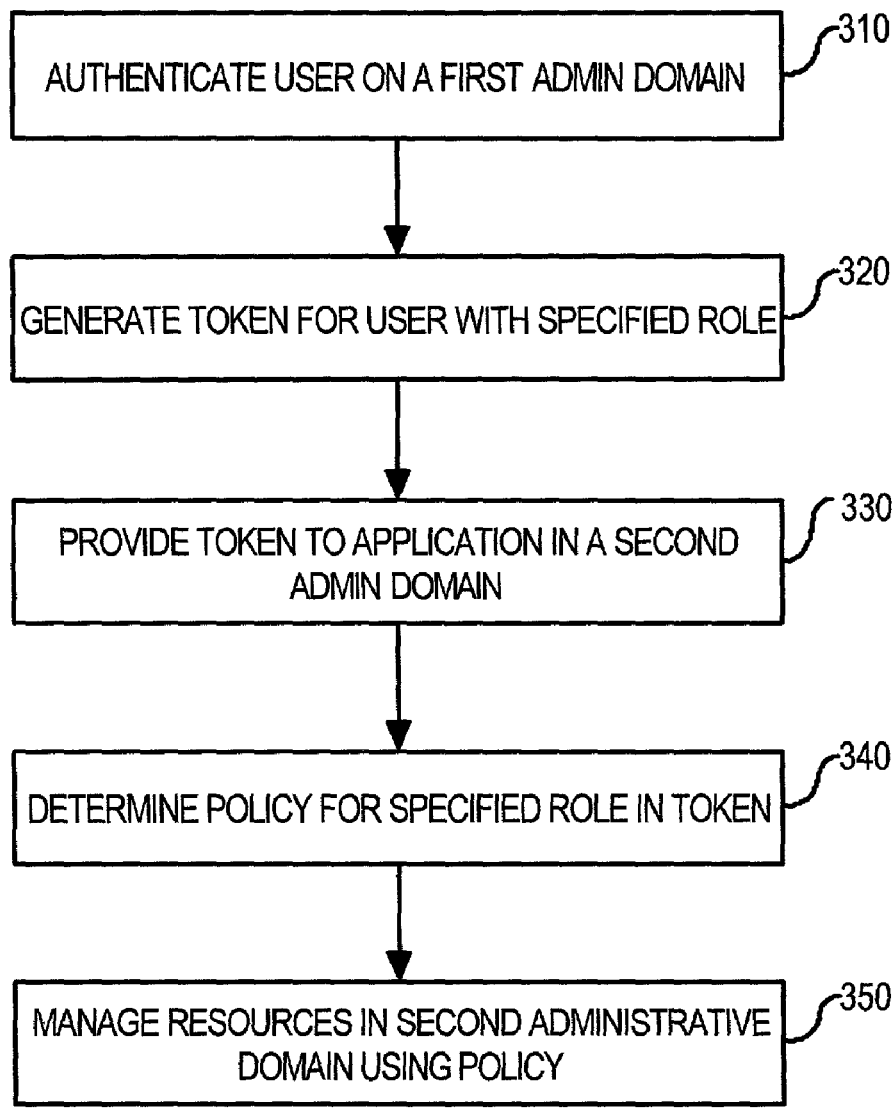
FIG. 3 is a flow diagram that illustrates a method for managing network resources for externally authenticated users.

FIG. 3 is a flow diagram that illustrates a method for managing network resources for externally authenticated users.

Figure 4:
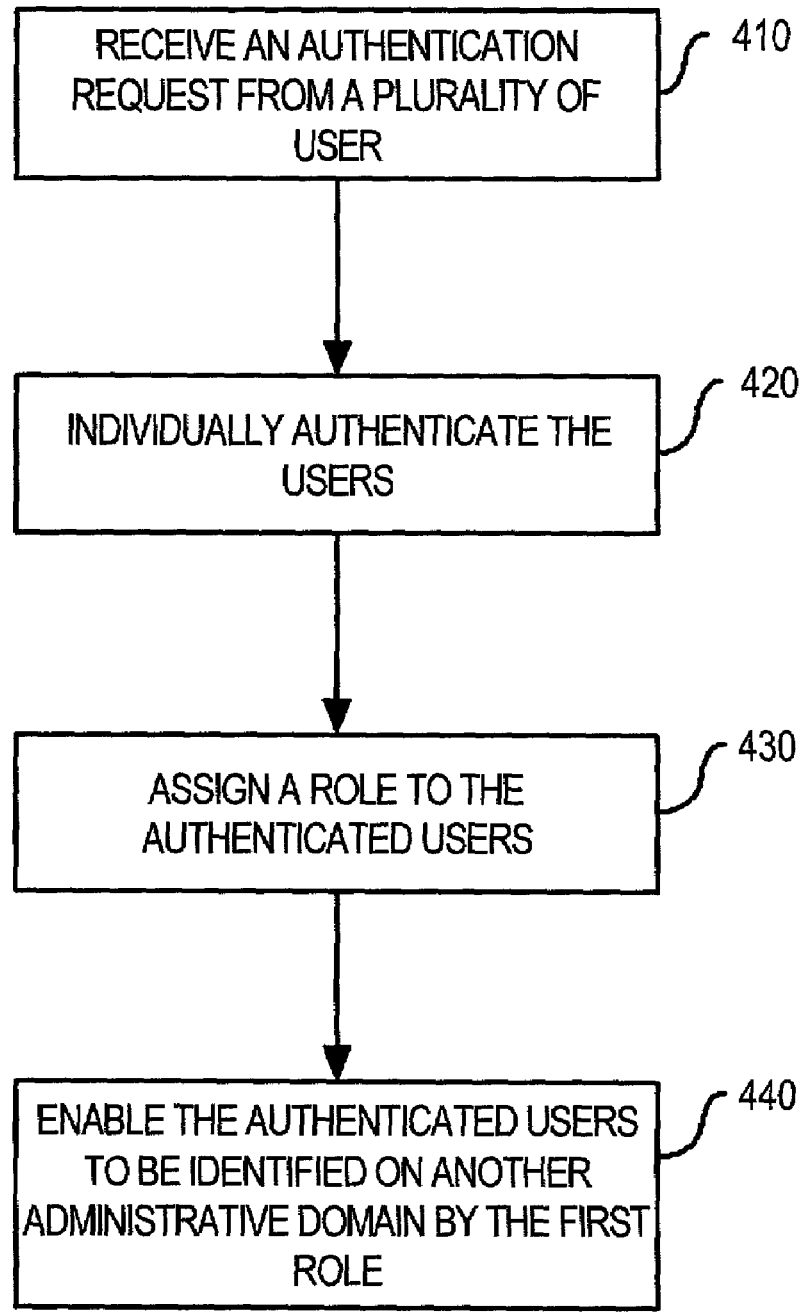
FIG. 4 is a flow diagram that illustrates another method for managing network resources for externally authenticated users from an administrative domain of a user.

FIG. 4 is a flow diagram that illustrates another method for managing network resources for externally authenticated users from an administrative domain of a user.

For purpose of illustrating a simple example, the methods of FIG. 3 and FIG. 4 are described herein in the context of FIG. 1 and elements of FIG. 1. However, the methods of FIG. 3 and FIG. 4 are not limited to that specific context, but are broadly applicable for purposes identified in this disclosure.

The method of FIG. 3 may assign users to roles that are subsequently used to identify policies for accessing resources on different administrative domains.

In step 310, a user is authenticated in first administrative domain 110. As described, the authentication process may require the user to submit login information such as a user name and/or password. Alternatively, the authentication may be made through other mechanisms, such as a secure cookie.

In step 320, a token is generated that assigns a role to the user. For example, the user may be assigned a "general" role to enable access only to public resources on different administrative domains. Alternatively, the user may be assigned an "administrator" role to enable the user to access highly secure resources in different administrative domains.

In step 330, the token is provided to an application in second administrative domain 120. The application may manage resources in the second administrative domain 120.

In step 340, a policy is determined for the role identified for the user by the token. For example, if the identified role is "administrator", then the policy may allow the user to access secure resources on second administrative domain 120, even though the user was authenticated on first administrative domain 110. In an embodiment, a role is provided to the user in first administrative domain 110. The second administrative domain 120 identifies a policy for that role by first mapping the role of the first administrative domain to a role used by the second administrative domain.

In step 350, the user is allowed to access the resources on second administrative domain 120 according to the policy determined in step 340. Thus, the request for secure resources may be allowed if the policy in step 340 is that of "administrator".

Referring now to FIG. 4, in another example, multiple users are assigned the same role in one administrative domain, and that role is used to select a policy to access network resources in another administrative domain.

In step 410, an authentication request is received from multiple users of a first administrative domain 110. In step 420, the users are individually authenticated. The authentication process is performed by an administrative component of the first administrative domain 110.

In step 430, the authenticated users are assigned a role. The role is an identifier for policy servers on different administrative domains. Other features of the token may also be used to identify the policy for that user. As such, the users are identified by the role to the other policy servers. A user's individual identification may become irrelevant to external administrative domains after that user is authenticated in the user's administrative domain. In one embodiment, the identity of the users may be hidden or encrypted from other policy servers, so that each user is identifiable only by assigned role.

In step 440, authenticated users are enabled so as to be identifiable on other administrative domains by the assigned roles. In an embodiment such as described with FIG. 1, step 440 may involve generating information, which may be packaged in data structures such as tokens, and which can then be signaled to components of the other administrative domains. The client 105 of FIG. 1, for example, may be configured to signal the token with all communications to other administrative domains.

The first and second administrative domains 110, 120 may include logic to enable resources and policies to be shared between the administrative domains. For example, business logic between the two administrative domains may enable the second administrative domain 120 to bill a proprietor of first administrative domain 110 for services provided to users of first administrative domain. The bills are for users who were identified as being from the first administrative domain 110, rather than for users that were identified on an individual basis.

In other embodiments, the assigned role may be associated with the user on another computer. Communications by the user to other administrative domains includes informing the components of the other administrative domains of the existence and location of the role associated with a particular user. The components of the other administrative domain may then access the computer where that role is stored.

D. Token Description

Figure 5:
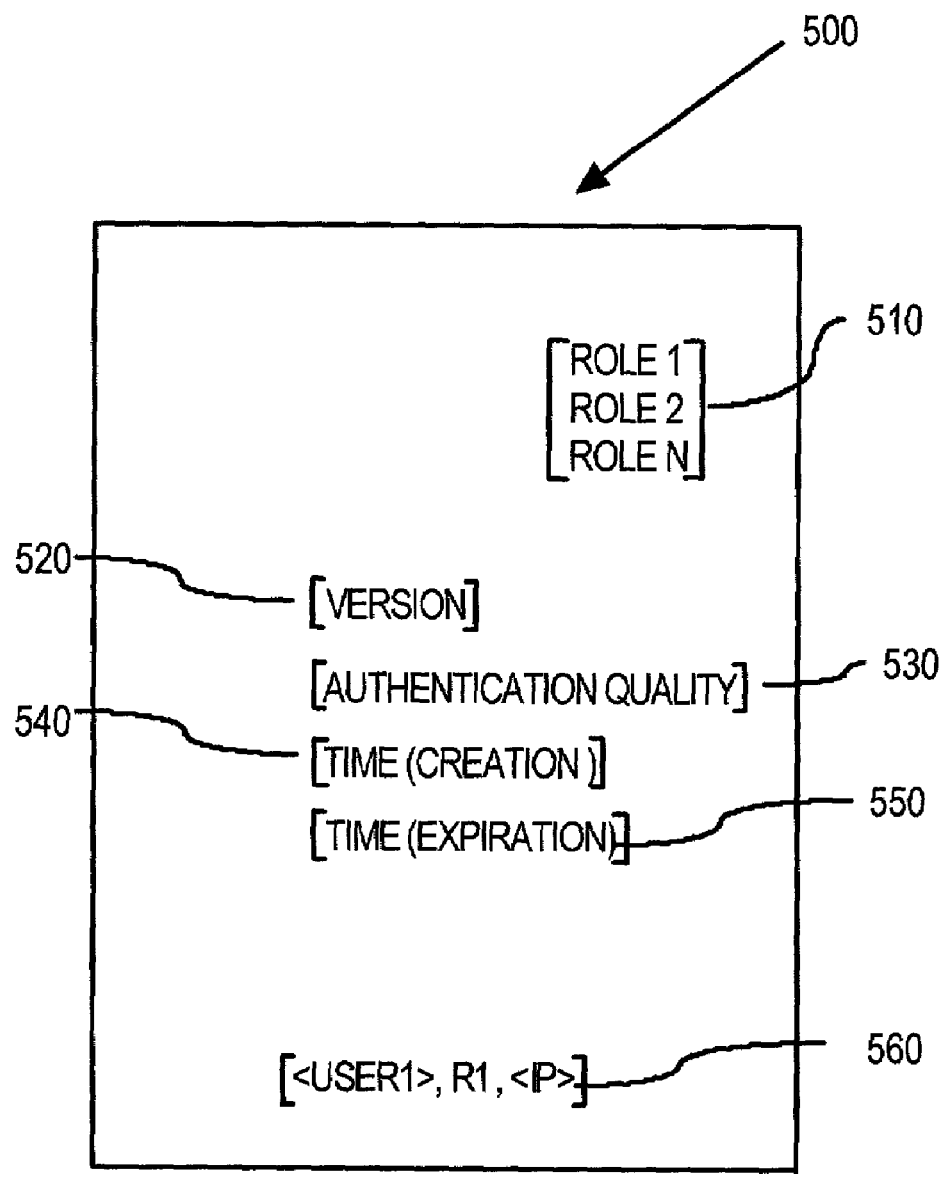
FIG. 5 is a diagram of an illustrative data structure for a token.

FIG. 5 is a diagram of an illustrative data structure for a token. The example data structure of FIG. 5 is intended to illustrate one possible structure for the contents and/or functions of a token 500.

Some elements of token 500 include: (i) an element 510 to indicate one or more roles 510 that the corresponding user may occupy, (ii) an element 520 to indicate a version of the application used to create token 500, (iii) an element 530 to indicate the authentication quality in which the token 500 was created, (iv) a creation time stamp 540 to indicate when token 500 was created, (v) an expiration time stamp 550 to indicate when token 500 is to be expired, and (vi) a handle 560 to provide information about the token at a user-level and/or at a programmer's level. The information that can be provided by handle 560 includes a user's identification, at least one of the roles assigned to the user, and a network address of the user. The handle 560 may also provide, for example, an address of the authentication component that authenticated the user.

In an embodiment, some or all of the information provided in token 500 may be hidden from components of external administrative domains. In one implementation, the identification of the user is encrypted. The address of the user may also be encrypted. This may require encrypting all or portions of handle 560.

Several variations are possible. For example, token 500 may be configured to enable the user to occupy any one of the roles R1, R2 and Rn in element 510 on an external administrative domain. The expiration time of element 550 may be associated with specific roles R1, R2 of element 510, while other roles in element 510 are not assigned an expiration time. Thus, if R1 coincides with an "administrator" role, the token 500 may provide that this role expires after a set time limit. The same user, however, may be given concurrently a "general" role that is indefinite for the duration of the network session.

Other information that may be included with token 500 may indicate a source where the token was created. For example, an Internet Protocol address may be provided for an authentication component (or other component) that created token 500.

There are numerous ways in signaling token 500 to applications for requests to resources. In Web-based applications, for example, a communication header to an application of an external administrative domain may include the token 500. Alternatively, the communication header may include an indication that token 500 exists, along with an address and a pointer to where the token 500 resides while its user is engaged in an ongoing network session. In either case, applications in other administrative domains need to be configured to receive the token 500 and to identify its information.

E. Hardware Overview

Figure 6:
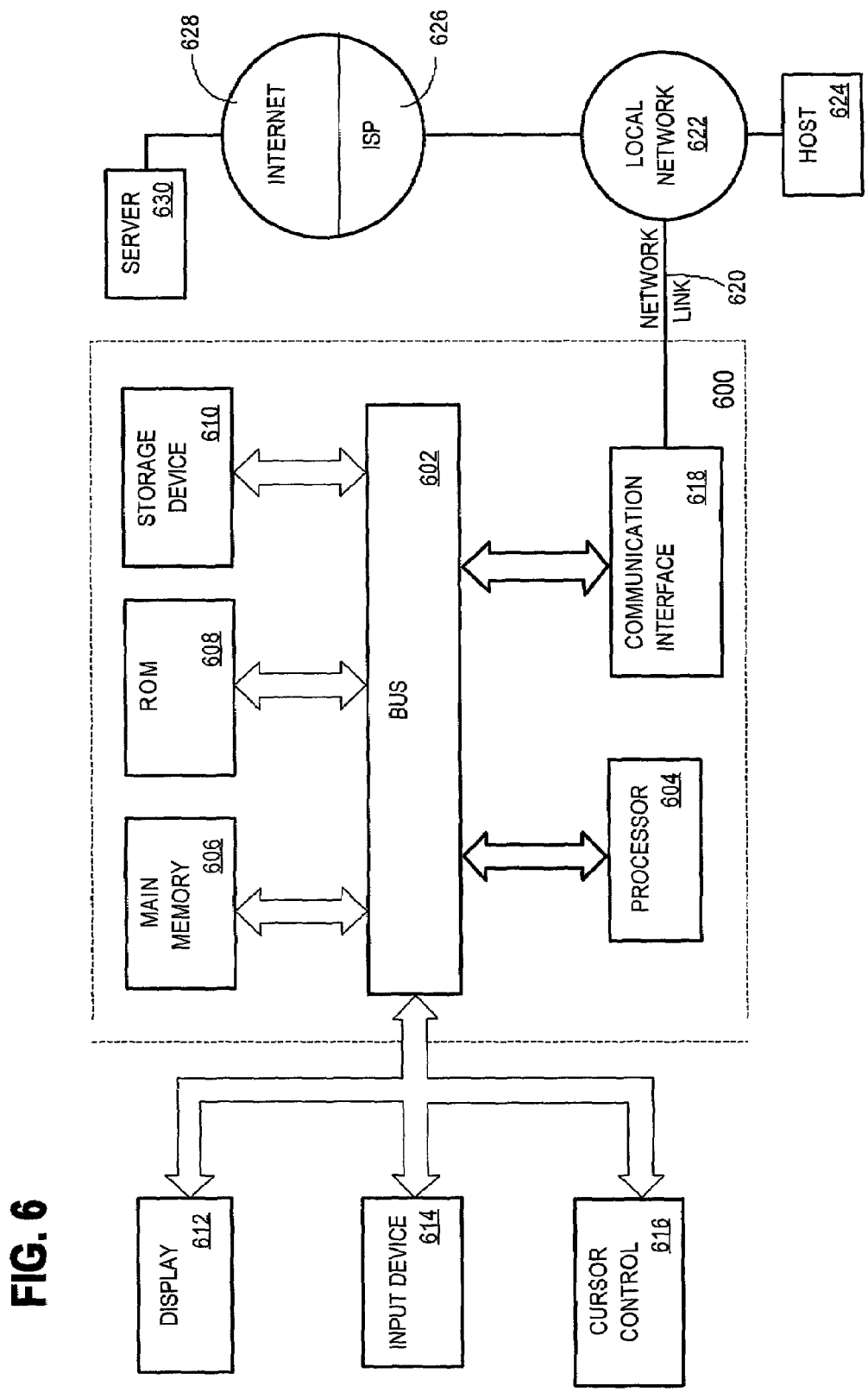
FIG. 6 is a block diagram that illustrates a computer system upon which an embodiment may be implemented.

FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for managing network resources for externally authenticated users. According to one embodiment of the invention, a policy determinitive identification such as a token is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for enabling administrative components to configure client communications so as to signal to another administrative domain a policy determinitive identification, as described herein.

The received code may be executed by processor 604 as it is received, and/or stored in storage device 610, or other non-volatile storage for later execution. In this manner, computer system 600 may obtain application code in the form of a carrier wave.

F. CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing network resources for externally authenticated users, the method comprising:
   authenticating a user in a first administrative domain;
   generating a token for the user, the token assigning at least a first role for the user, the first role identifying the user as a member of a pre-defined class of users; and
   configuring the token to identify the user by the first role to a component of a second administrative domain; and
   receiving a request from the user to retrieve network resources from the second administrative domain and;
   determining whether the user is authorized to access the network resources of the second administrative domain based on the first role in the token.

2. The method of claim 1, wherein configuring the token to identify the user by the first role includes configuring the token to identify the user as the first role to the component of the second administrative domain without revealing a personal identification of the user to the component.

3. The method of claim 1, wherein configuring the token to identify the user by the first role includes configuring the token to identify the user by the first role to a policy server external to the first administrative domain, wherein the user is able to retrieve network resources from the second administrative domain according to a policy of the policy server.

4. A method as recited in claim 1,
   wherein determining whether the user is authorized to access the network resources of the second administrative domain includes determining whether the user is authorized to access the network resources according to a policy of the policy server and based on the first role in the token.

5. The method of claim 1, wherein generating a token for the user includes assigning multiple roles for the user on the first token, each of the multiple roles being identifiable to a policy server external to the first administrative domain.

6. The method of claim 1, further comprising the steps of:
   attaching the token to a terminal associated with the user;
   automatically receiving the token at the second administrative domain when the user requests one or more resources from the second administrative domain.

7. The method of claim 1, further comprising the steps of:
   attaching an indicator for the token to a terminal associated with the user;
   automatically receiving the indicator to the component to inform the component of a location of the token on another computer.

8. The method of claim 1, wherein generating a token for the user includes providing information about a quality of authentication for the user.

9. The method of claim 1, wherein generating a token for the user includes providing information about a location of the user in the token.

10. The method of claim 1, wherein generating a token for the user includes providing information in the token about a personal identification of the user, a time stamp for when the token was generated, and the first role.

11. The method of claim 1, wherein generating a token for the user includes providing information in the token selected from a group of information consisting of information about a personal identification of the user, a time stamp for when the token was generated, and the first role; and further including the steps of encrypting at least some of the information in the token for use in the second administrative domain.

12. A method for managing network resources in multiple administrative domains, the method comprising:
   in a first administrative domain:
      authenticating a user in response to a request to access one or more resources in the first administrative domain;
      generating a token for the user, the token assigning at least a first role to the user, the first role identifying the user as a member of a class of users;
   in second administrative domain:
      receiving a second request from the user to access one or more second resources in the second administrative domain, wherein the second request includes the token;
      identifying a first policy for the first role specified by the token; and
      managing access of the user to the second resources according to the first policy.

13. The method of claim 12, wherein managing the user according to the first policy includes checking the first policy to determine if an operation requested by the user for the second resources of the second administrative domain is permitted for the first role.

14. The method of claim 12, wherein managing the user according to the first policy includes checking the first policy to determine if an operation requested by the user for the second resources of the second administrative domain is permitted for the first role.

15. The method of claim 12, wherein managing the user according to the first policy includes checking the first policy to determine if an operation requested by the user for the second resources of the second administrative domain is permitted for the first role, and wherein the method further comprises allowing execution of the operation on the second resources only if the policy permits for the operation to be performed by any user assigned the first role.

16. The method of claim 12, wherein managing the user according to the first policy includes checking the first policy to determine if an operation requested by the user for the second resources of the second administrative domain is permitted for the first role, and wherein the method further comprises allowing execution of the operation on the second resources only if the policy permits for the operation to be performed by any user assigned the first role.

17. The method of claim 12, wherein managing the user according to the first policy includes identifying an allowable time period in which any user assigned the first role can access the second resources of the second administrative domain, and wherein the method further includes determining if the user is accessing the second resources of the second administrative domain during the allowable time period.

18. A method for managing network resources for externally authenticated users, the method comprising:
- receiving a first request to authenticate a user in a first administrative domain;
- authenticating the user in the first administrative domain;
- generating a token for the user, wherein the token includes information defining a first role for the user, wherein the first role identifies the user as a member of a pre-defined class of users;
- receiving a second request from the user to access one or more network resources located in a second administrative domain; and
- determining whether to grant the user access to the network resources based on the role in the token and without re-authenticating the user in the second administrative domain.

19. A computer system for managing network resources, the computer system comprising:
- a storage medium that stores identification information for users that access the network;
- processing resources located in a first administrative domain, the processing resources being configured to:
  - authenticating a user in the first administrative domain;
  - generate a token for the user in response to the user, the token identifying at least a first role for the user and identifying the user as a member of a pre-defined class of users; and
  - configure the token to enable the user to be identified by the first role in a second administrative domain, wherein the user is provided access to a resource of the second administrative domain according to a policy for the first role;
- receiving a request from the user to retrieve network resources from the second administrative domain;
- determining whether the user is authorized to access the network resources of the second administrative domain based on the first role in the token.

20. The computer system of claim 19, wherein the processing resource is configured to authenticate the user by accessing the identification information in the first storage medium.

21. The computer system of claim 19, wherein the processing resources is configured to associate the token with the user for a duration when the terminal of the user is connected to the network.

22. The computer system of claim 19, wherein the token expires after the terminal is disconnected from the network.

23. A tangible computer-readable medium for managing network resources in multiple administrative domains, the computer-readable medium carrying instructions for performing the steps of:
- assigning at least a first role to a plurality of users that access a first administrative domain; and
- causing each of the plurality of users to be identified by the first role on a component of the second administrative domain, wherein the first role identifies a policy that is shared by the plurality of users for accessing resources managed in the second administrative domain;
- receiving a request from the user to retrieve network resources from the second administrative domain and;
- determining whether the user is authorized to access the network resources of the second administrative domain based on the first role in the token.

24. The tangible computer-readable medium of claim 23, further comprising instructions for authenticating the plurality of users in a first administrative domain before assigning at least a first role to the plurality of users.

25. The tangible computer-readable medium of claim 23, further comprising assigning at least the first role to a plurality of users during a network session between each of the users and the first administrative domain, and causing each of the plurality of users to be identified by the first role after each of the plurality of users selects to access the second administrative domain during the network session.

26. The tangible computer-readable medium of claim 23, further comprising assigning at least a first role to a plurality of users includes generating a token that identifies the first role to a policy server of the second administrative domain.

* * * * *